United States Patent [19]

Joormann

[11] Patent Number: 4,459,510
[45] Date of Patent: Jul. 10, 1984

[54] LAMP HAVING A GLASS LAMP VESSEL AND GLASS (NA-CA-BA-SIO$_2$ WITH B$_2$O$_3$/AL$_2$O$_3$/ZRO$_2$) SUITABLE THEREFOR

[75] Inventor: Hendrik J. M. Joormann, Eindhoven, Netherlands

[73] Assignee: U.S. Philips Corporation, New York, N.Y.

[21] Appl. No.: 529,655

[22] Filed: Sep. 6, 1983

Related U.S. Application Data

[63] Continuation of Ser. No. 214,592, Dec. 8, 1980, abandoned.

[30] Foreign Application Priority Data

Dec. 28, 1979 [NL] Netherlands .................... 7909332

[51] Int. Cl.$^3$ .......................... C03C 3/04; C03C 3/08
[52] U.S. Cl. ...................................... 313/636; 313/638;
501/65; 501/66; 501/67; 501/70; 501/72;
501/73; 501/77; 501/900
[58] Field of Search ................... 313/480; 501/65, 66,
501/67, 68

[56] References Cited

U.S. PATENT DOCUMENTS

| | | | |
|---|---|---|---|
| 1,943,051 | 1/1934 | Berger | 501/73 X |
| 3,563,772 | 2/1971 | Joormann et al. | 501/70 |
| 4,036,654 | 7/1977 | Yale | 501/67 |
| 4,122,460 | 10/1978 | Humenik et al. | 501/70 |
| 4,179,300 | 12/1979 | Sagara | 501/72 X |
| 4,265,667 | 5/1981 | Ikeda et al. | 501/73 X |

FOREIGN PATENT DOCUMENTS

| | | | |
|---|---|---|---|
| 2504153 | 8/1975 | Fed. Rep. of Germany | 313/480 |
| 1492433 | 7/1967 | France . | |
| 53-16717 | 2/1978 | Japan | 501/73 |
| 1188015 | 9/1968 | United Kingdom | 313/636 |

Primary Examiner—Helen M. McCarthy
Attorney, Agent, or Firm—Norman N. Spain

[57] ABSTRACT

The invention relates to lamps having a glass lamp vessel (1) and to a glass suitable therefor. The relevant glass is adequately resistant to attack by electrons, is resistant to atmospheric influences and is properly workable in a gas flame. This glass contains 44-60 mole % silicon oxide; 0-7.5 mole % boron oxide; 0-6 mole % zirconium oxide; 0-7.5 mole % aluminium oxide; 5-20 mole % calcium oxide; 12.5-25 mole % barium oxide; 0-15 mole % magnesium oxide; 0-10 mole % strontium oxide; 2-8 mole % sodium oxide. The sum of the alkaline earth metals is 25-42.5 mole %.

No discoloration occurs in sodium vapor discharge lamps when the lamp vessel has been made of this glass.

8 Claims, 1 Drawing Figure

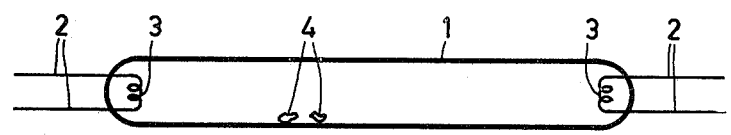

LAMP HAVING A GLASS LAMP VESSEL AND GLASS (NA-CA-BA-SIO₂ WITH B₂O₃/AL₂O₃/ZRO₂) SUITABLE THEREFOR

This is a continuation of application Ser. No. 214,592, filed Dec. 8, 1980, now abandoned.

The invention relates to a discharge lamp having a glass lamp vessel which is sealed in a vacuum-tight manner, the lamp vessel comprising electrodes which are connected to two current supply leads and between which a discharge takes place during operation of the lamp, the lamp vessel being filled with a gas atmosphere and a metal which evaporates at least partly during operation of the lamp, the lamp vessel being made of a glass which contains silicon oxide, boron oxide, aluminum oxide, calcium oxide, barium oxide and sodium oxide.

The invention also relates to a glass containing silicon oxide, boron oxide, aluminum oxide, calcium oxide, barium oxide and sodium oxide.

The invention relates more in particular to lamps the lamp vessel of which must be resistant to attack by electrons. Examples of such lamps are sodium vapour discharge lamps and mercury vapour discharge lamps. It was found that the corrosion by metal vapours is triggered by the transfer of electrons. The glass according to the invention is adequately resistant to electron attack.

In practice, borate glasses are used as the envelope for sodium vapour discharge lamps. In general, these glasses have a poor resistance to atmospheric influences. For that reason the borate glasses are usually deposited on the inside of a substrate glass which is resistant to atmospheric influences. The production of such a laminated lamp vessel is however, complicated.

Therefore glasses were sought which are resistant to sodium vapour and to atmospheric influences. U.S. Pat. No. 3,563,772 describes a glass which contains 14-43 mole % $SiO_2$; 0-10 mole % $B_2O_3$; 9-37 mole % $Al_2O_3$; 15-61 mole % CaO; 0-35 mole % BaO; 0-24 mole % BeO; 0-24 mole % MgO; 0-27.5 mole % $Li_2O+Na_2O$, the sum of $Ca+BaO+BeO+MgO+Li_2O+Na_2O$ being 38-61. This known glass is resistant to sodium vapour up to a temperature of approximately 600° C., has an adequate resistance to atmospheric influences and is stated in the patent to be "easy to melt in a natural gas flame without devitrifying readily". The known glass is used as the envelope for sodium vapour discharge lamps.

In practice it was found that this glass cannot be worked easily enough in a gas flame to enable working on machines for the production of lamps, the reasons being that crystallisation occurs easily.

The invention provides a lamp made of a glass which is adequately resistant to electron attack and to atmospheric influences and which can be worked much easier in a flame, for example for deforming, sealing etc., without the occurrence of crystallization.

The lamp according to the invention is characterized in that the lamp vessel is made of a glass the composition of which in mole percent is as follows: 44-60 mole % $SiO_2$; 0-7.5 mole % $B_2O_3$; 0-6 mole % $ZrO_2$; 0-7.5 mole % $Al_2O_3$; 5-20 mole % CaO; 12.5-25 mole % BaO; 0-15 mole % MgO; 0-10 mole % SrO; 2-8 mole % $Na_2O$, the sum of the alkaline earth metal oxides being 25-42.5 mole %.

The glass according to the invention is characterized in that the glass contains 44-60 mole % $SiO_2$; 0-7.5 mole % $B_2O_3$; 0-6 mole % $ZrO_2$; 0-7.5 mole % $Al_2O_3$; 5-20 mole % CaO; 12.5-25 mole % BaO; 0-15 mole % MgO; 0-10 mole % SrO; 2-8 mole % $Na_2O$, the sum of the alkaline earth metals being 25-42.5 mole %.

The glass according to the invention is resistant to sodium vapour to a temperature of 300° C. and higher, has a sufficiently adequate resistance to atmospheric influences to enable its use without a substrate glass and it can be more easily worked in a flame than the glass known from U.S. Pat. No. 3,563,772.

In order to achieve a proper meltability in a ceramic crucible (that is to say without corrosion of the crucible) a glass, the composition of which in mole percent is as follows: 55-60 mole % $SiO_2$; 4-6 mole % $ZrO_2$; 25-7.5 mole % $Al_2O_3$; 10-15 mole % CaO; 12.5-20 mole % BaO; 0-5 mole % MgO; 0-5 mole % SrO; 2-8 mole % $Na_2O$, the sum of the alkaline earth metals being 25-30 mole %, is preferably used to produce a lamp vessel.

Glasses which are resistant to an optimum extent to sodium vapour to a temperature of 400° C. or higher have the following composition in mole percent: 45-50 (preferably 47-48) mole % $SiO_2$; 0-5 (preferably 0) mole % $B_2O_3$; 4.5-5.5 mole % $ZrO_2$; 4-6 mole % $Al_2O_3$; 12.5-18 (preferably 17-18) mole % CaO; 19-21 mole % BaO and 2.5-7.5 (preferably 4-6) mole % $Na_2O$.

French patent specification No. 1,492,433 describes a sodium vapour-resistant glass which contains 60-61% by weight of $SiO_2$; 5.5-18% by weight of $B_2O_3$; 4.5-11% by weight of $ZrO_2$; 0.5-7% by weight of $Na_2O$; 1-8.5% by weight of CaO; 6-8% by weight of BaO and 0-8% by weight of $K_2O$. It is described that these glasses are sodium vapour-resistant up to a temperature of 350° C. From our own experiments it has appeared that glass no. 1 in the Table included in this French Patent Specification has a sodium resistance at a temperature of less than 300° C. (determined by means of the method described hereafter).

The temperature to which the glasses are resistant to sodium were always determined in the same way, as will be further explained in the examples given hereinafter.

The composition of the glass is always computed on the bases of the quantity of raw materials which are fused together.

All conventional techniques can be used to produce the lamp according to the invention.

Oxides, carbonates, hydroxides etc. may be used as the raw materials to prepare the glass according to the invention.

The invention will be further explained by way of non-limitative example with reference to a drawing and to the following examples.

BRIEF DESCRIPTION OF DRAWING

The drawing shows an example of a lamp according to the invention. The drawing relates to a so-called low-pressure sodium vapour discharge lamp. The lamp consists of a lamp vessel 1, which is sealed in a vacuum-tight manner. Current feed-through wires 2 are led through the lamp vessel walls. The current feed-through wires 2 are connected to electrodes 3. In the shown embodiment the electrodes 3 consist of filaments. Any further known embodiment is of course suitable for the electrodes. A small quantity of metallic sodium 4, which evaporates after ignition of the lamp, is contained within the lamp vessel 1.

EXAMPLES

A range of glass compositions having a composition as specified in the following table were fused together. Fusing these glasses together was carried out in a platinum crucible in an electric oven. The starting materials were quartz sand, boric acid, aluminum oxide, zirconium oxide and the carbonates of calcium, barium, magnesium, strontium and sodium (not all these metals being used in all the examples). No special problems were encountered during the fusing operation. The glass in accordance with example X could be fused in a ceramic crucible.

Fragments of each composition shown in the table were sealed in vacuum in a glass tube together with approximately half a gram of metallic sodium. The glass fragments and the sodium were kept together at a certain temperature for 24 hours; the lowest temperature at which a first trace of discoloration of the fragments was detected after this thermal treatment is included in the following Table under the heading "Na resistance (° C.)". It should be noted that at the time the same manner of determination was used to determine the sodium resistance of the glasses disclosed in the U.S. Pat. No. 3,563,772.

The table shows that all glasses according to the invention have a reasonable to good resistance to sodium vapour.

The glasses having a composition as specified in the table could be worked without any problems in a gas flame, no crystallization or other problems occurring.

A lamp was made of a glass having a composition of Example number VIII. The lamp was a low-pressure sodium vapour discharge lamp as shown in the drawing. The lamp was filled with a neon-argon gas mixture (99% by volume Ne and 1% by volume Ar) at a total gas pressure of 5.5 torr (730 Pa). The supply of current to the lamp was controlled so that the temperature of the lamp vessel wall was approximately 260° C. (in the warmest spot). The sodium vapour pressure was approximately $3 \times 10^{-3}$ torr (0.4 Pa). No discoloration of the glass occurred, not even after the lamp had been in operation for 1500 hours.

What is claimed is:

1. A discharge lamp having a glass lamp vessel sealed in a vacuum-tight manner, two electrodes positioned in said lamp vessel and connected to current supply wires for producing a discharge in said lamp vessel during operation of said lamp, said lamp vessel being filled with a gas atmosphere and containing a metal which evaporates at least partially during operation of the lamp characterized in that, the lamp vessel is made of a glass resistant to attack by electrons and by the atmosphere and is highly flame workable and consists essentially of 44–60 mole % $SiO_2$, 0–7.5 mole % $B_2O_3$, 0–6 mole % $ZrO_2$, 0–7.5 mole % $Al_2O_3$, 5–20 mole % CaO, 12.5–25 mole % BaO, 0–15 mole % MgO, 0–10 mole % SrO and 2–8 mole % $Na_2O$ and wherein the total mole percent of CaO, BaO and SrO is 25–42.5 mole % and at least 5 mole % of at least one of $B_2O_3$, $ZrO_2$ and $Al_2O_3$ is present.

2. A lamp as claimed in claim 1, characterized in that the lamp vessel is made of a glass consisting essentially of 55–60 mole % $SiO_2$; 4–6 mole % $ZrO_2$; 2.5–7.5 mole % $Al_2O_3$; 10–15 mole % CaO; 12.5–20 mole % BaO; 0–5 mole % MgO; 0–5 mole % SrO; 2–8 mole % $Na_2O$, the sum of CaO, BaO, and SrO being 25–30 mole %.

3. A lamp as claimed in claim 1, characterized in that the lamp vessel is made of a glass consisting essentially of 45–50 mole % $SiO_2$; 0–5 mole % $B_2O_3$; 4.5–5.5 mole % $ZrO_2$; 4–6 mole % $Al_2O_3$; 12.5–18 mole % CaO; 19–21 mole % BaO and 2.5–7.5 mole % $Na_2O$.

4. A lamp as claimed in claim 3, characterized in that the lamp vessel is made of a glass consisting essentially of 47–48 mole % $SiO_2$; 4.5–5.5 mole % $ZrO_2$; 4–6 mole % $Al_2O_3$; 17–18 mole % CaO; 19–21 mole % BaO and 4–6 mole % $Na_2O$.

5. A glass resistant to attack by electrons and by the atmosphere and highly flame workable consisting essentially of 44–60 mole % $SiO_2$, 0–7.5 mole % $B_2O_3$, 0–6 mole % $ZrO_2$, 0–7.5 mole % $Al_2O_3$, 5–20 mole % CaO, 12.5–25 mole % BaO, 0–15 mole % MgO, 0–10 mole % SrO and 2–8 mole % $Na_2O$ and wherein the total mole % of CaO, BaO and SrO is 25–42.5 mole % and at least 5 mole % of at least one of $B_2O_3$, $ZrO_2$ and $Al_2O_3$ is present.

6. A glass as claimed in claim 5, consisting essentially of 55–60 mole % $SiO_2$; 4–6 mole % $ZrO_2$; 2.5–7.5 mole % $Al_2O_3$; 10–15 mole % CaO; 12.5–20 mole % BaO; 0–5 mole % MgO; 0–5 mole % SrO; 2–8 mole % $Na_2O$, the sum of the CaO, BaO, and SrO being 25–30 mole %.

7. A glass as claimed in claim 5, consisting essentially of 45–50 mole % $SiO_2$; 0–5 mole % $B_2O_3$; 4.5–5.5 mole % $ZrO_2$; 4–6 mole % $Al_2O_3$; 12.5–18 mole % CaO; 19–21 mole % BaO and 2.5–7.5 mole % $Na_2O$.

8. A glass as claimed in claim 5, consisting essentially of 47–48 mole % $SiO_2$; 4.5–5.5 mole % $ZrO_2$; 4–6 mole % $Al_2O_3$; 17–18 mole % CaO; 19–21 mole % BaO and 4–6 mole % $Na_2O$.

* * * * *

TABLE

| Example | Composition in mole % | | | | | | | | Composition in wt. % | | | | | | | | Na resistance (°C.) |
|---|---|---|---|---|---|---|---|---|---|---|---|---|---|---|---|---|---|
| | $SiO_2$ | $B_2O_3$ | $ZrO_2$ | $Al_2O_3$ | CaO | BaO | MgO | $Na_2O$ | $SiO_2$ | $B_2O_3$ | $ZrO_2$ | $Al_2O_3$ | CaO | BaO | MgO | $Na_2O$ | |
| I | 50 | 5 | — | 5 | 15 | 20 | — | 5 | 37.2 | 4.3 | — | 6.3 | 10.4 | 38 | — | 3.8 | 400 |
| II | 50 | 5 | 5 | 5 | 10 | 20 | — | 5 | 35.7 | 4.1 | 7.3 | 6.1 | 6.7 | 36.4 | — | 3.7 | 350 |
| III | 45 | 5 | 5 | 5 | 15 | 20 | — | 5 | 32.2 | 4.2 | 7.3 | 6.1 | 10 | 36.5 | — | 3.7 | 400 |
| IV | 50 | — | 5 | 5 | 15 | 20 | — | 5 | 36 | — | 7.4 | 6.1 | 10.1 | 36.7 | — | 3.7 | 400 |
| V | 50 | — | 5 | 5 | 10 | 15 | 10 | 5 | 39 | — | 8 | 6.6 | 7.3 | 29.9 | 5.2 | 4.0 | 375 |
| VI | 50 | — | 5 | 5 | 12.5 | 20 | — | 7.5 | 35.9 | — | 7.4 | 6.1 | 8.4 | 36.6 | — | 5.6 | 400 |
| VII | 50 | — | 5 | 5 | 17.5 | 20 | — | 2.5 | 36.1 | — | 7.4 | 6.1 | 11.8 | 36.7 | — | 1.9 | 400 |
| VIII | 47.5 | — | 5 | 5 | 17.5 | 20 | — | 5 | 34.2 | — | 7.4 | 6.1 | 11.8 | 36.8 | — | 3.7 | 425 |
| IX | 55 | — | 5 | — | 15 | 20 | — | 5 | 40.6 | — | 7.6 | — | 10.3 | 37.7 | — | 3.8 | 350 |
| X | 57.5 | — | 5 | 5 | 12.5 | 15 | — | 5 | 44 | — | 7.7 | 6.5 | 8.8 | 29.1 | — | 3.9 | 325 |